United States Patent
Harada et al.

(10) Patent No.: US 9,720,474 B2
(45) Date of Patent: Aug. 1, 2017

(54) ELECTRONIC CONTROL UNIT

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Yasuhiko Harada, Nagoya (JP); Shizuo Manabe, Toyota (JP); Satoshi Shizuka, Seto (JP)

(73) Assignees: DENSO CORPORATION, Kariya (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 492 days.

(21) Appl. No.: 14/510,316

(22) Filed: Oct. 9, 2014

(65) Prior Publication Data

US 2015/0148920 A1    May 28, 2015

(30) Foreign Application Priority Data

Nov. 22, 2013 (JP) ................ 2013-242106

(51) Int. Cl.
    *G06F 1/26* (2006.01)
    *G06F 1/32* (2006.01)

(52) U.S. Cl.
    CPC ............ *G06F 1/263* (2013.01)

(58) Field of Classification Search
    CPC .......... G06F 1/263; G06F 1/3203; G06F 1/30; G06F 1/26; G06F 1/3212
    See application file for complete search history.

(56) References Cited

U.S. PATENT DOCUMENTS

| 7,702,837 B2* | 4/2010 | Mok | .............. G06F 1/1632 165/80.3 |
| 7,800,255 B2* | 9/2010 | Coonan | ............. G06F 1/16 307/149 |

(Continued)

FOREIGN PATENT DOCUMENTS

JP    2014-099099 A    5/2014

OTHER PUBLICATIONS

Brandl et al., Batteries and battery management systems for electric vehicles, Mar. 2012, 6 pages.*

(Continued)

*Primary Examiner* — Thuy Dao
(74) *Attorney, Agent, or Firm* — POSZ LAW GROUP, PLC

(57) ABSTRACT

An electronic control unit mounted in an object includes: a rewritable memory of control and reprogramming software; a not-always-on power supply system micro-computer operating in control and reprogramming modes and connected/disconnected with a power source; and an always-on power supply system micro-computer operating in the control and reprogramming modes and constantly connected with the power source. Each micro-computer includes: a first mode determination device determining whether to operate in an on-board mode when the power source starts to supply the electric power; and a second mode determination device determining whether to operate in the reprogramming mode. The always-on power supply system micro-computer includes a first transition device that detects a change in a power supply state of the not-always-on power supply system micro-computer. The first transition device switches a processing to a determination executed by the first mode determination device when the power supply state has changed.

3 Claims, 10 Drawing Sheets

(56) References Cited

U.S. PATENT DOCUMENTS

| | | | | |
|---|---|---|---|---|
| 8,160,727 B2* | 4/2012 | Coonan | ................ | G06F 1/1632 |
| | | | | 320/113 |
| 8,680,830 B2* | 3/2014 | Kudo | ................ | H02M 3/1584 |
| | | | | 323/283 |
| 9,231,410 B2* | 1/2016 | Wojcik | ................ | H05K 5/0086 |
| 2006/0227606 A1 | 10/2006 | Okamoto | | |
| 2009/0076630 A1 | 3/2009 | Okamoto | | |
| 2013/0145193 A1* | 6/2013 | Takahashi | ................ | G06F 1/24 |
| | | | | 713/323 |
| 2014/0195180 A1* | 7/2014 | Wojcik | ................ | H05K 5/0086 |
| | | | | 702/63 |

OTHER PUBLICATIONS

Kim et al., Dependable, efficient, scalable architecture for management of large-scale batteries, Apr. 2010, 10 pages.*

Yan et al., Characterizing, modeling, and improving the QoE of mobile devices with low battery level, Dec. 2015, 12 pages.*

\* cited by examiner

FIG. 8

| MI COMP IN REWRITE MODE | INSTANT P INTERRUPT MODE | ROM STATE AFTER INSTANT INTERRUPT |
|---|---|---|
| NOT-AL P SUP SYS MI COMP REWRITING | INSTANT INTERRUPT OF AL P SUP | NOT-AL P SUP SYS MI COMP SOFT ANOAMLY |
| | INSTANT INTERRUPT OF NOT-AL P SUP | NOT-AL P SUP SYS MI COMP SOFT ANOAMLY |
| AL P SUP SYS MI COMP REWRITING | INSTANT INTERRUPT OF AL P SUP | AL P SUP SYS MI COMP SOFT ANOAMLY |
| | INSTANT INTERRUPT OF NOT-AL P SUP | — |

ELECTRONIC CONTROL UNIT

CROSS REFERENCE TO RELATED APPLICATION

This application is based on Japanese Patent Application No. 2013-242106 filed on Nov. 22, 2013, the disclosure of which is incorporated herein by reference.

TECHNICAL FIELD

The present disclosure relates to an electronic control unit including an always-on power supply system microcomputer and a not-always-on power supply system microcomputer.

BACKGROUND

As described in Patent Document 1, for example, electronic control units including first and second microcomputers (hereafter, referred to as micros) have been conventionally proposed. Each micro-computer incorporates a nonvolatile memory in which data can be rewritten and a communication circuit connected to a communication line. When each micro-computer receives data to be written addressed to itself through the communication circuit, it writes the data to be written to its nonvolatile memory to update the data stored in the nonvolatile memory.

In such an electronic control unit as mentioned above, the following may take place: when at least one of the multiple micro-computers updates the data stored in its nonvolatile memory, transition is caused from control mode in which all the micro-computers carry out control processing to rewrite mode in which data rewrite processing is carried out. That is, the electronic control unit may synchronize the multiple micro-computers with respect to operating mode. This is intended to suppress malfunction of the electronic control unit due to collapse of the monitoring system between the micro-computers.

Some electronic control units operate on different power supply systems. For example, some electronic control units operate on both the following power supply systems: a not-always-on power supply system in which a power source is turned on and off (in other words, power is supplied and power supply is stopped) by a user's manipulation; and an always-on power supply system in which power is constantly supplied. In such an electronic control unit, the following micro-computers may be provided: a micro-computer that operates on the not-always-on power supply system and a micro-computer that operates on the always-on power supply system.

When an electronic control unit is operating in rewrite mode, power supply to a micro-computer can be stopped. In this case, the following can take place in the electronic control unit that operates different power supply systems when power supply to the micro-computer is resumed and rewriting is carried out again: the timing of staring operation can differ between the micro-computer that operates on the not-always-on power supply system and the micro-computer that operates on the always-on power supply system. For this reason, the electronic control unit cannot synchronize the micro-computers with respect to operating mode and can malfunction.

[Patent Document 1] Japanese Unexamined Patent Application Publication No. 2006-268107 (corresponding to US 2006/0227606 A1)

SUMMARY

It is an object of the present disclosure to provide an electronic control unit, in which malfunction can be suppressed.

According to an aspect of the present disclosure, an electronic control unit mounted in an object includes: a rewritable memory that stores control software and reprogramming software; a not-always-on power supply system micro-computer that operates in a control mode as an operating mode based on the control software and in a reprogramming mode as an operating mode based on the reprogramming software, wherein the reprogramming mode provides to rewrite the control software stored in the memory, and the not-always-on power supply system micro-computer is connected with a power source to be supplied an electric power from the power source according to a user operation, and is disconnected from the power source to stop supplying the electric power according to the user operation; and an always-on power supply system micro-computer that operates in the control mode and in the reprogramming mode, wherein the always-on power supply system micro-computer is constantly connected with the power source to be supplied the electric power from the power source without the user operation. Each of the not-always-on power supply system micro-computer and the always-on power supply system micro-computer includes: a first mode determination device that determines whether to operate in an on-board mode when the power source starts to supply the electric power, the on-board mode being an operating mode not carried out under a condition that the electronic control unit is mounted in the object, and being different from the control mode and the reprogramming mode, which are carried out under a condition that the electric control unit is mounted in the object; and a second mode determination device that determines whether to operate in the reprogramming mode according to a determination whether the control software is normally written in the memory when the first mode determination device determines not to operate in the on-board mode. When it is determined that the control software is not normally written in the memory, the second mode determination device determines to operate in the reprogramming mode, and instructs another micro-computer to operate in the reprogramming mode. The first mode determination device determines not to operate in the on-board mode when the first mode determination device is not instructed to operate in the reprogramming mode. The first mode determination device determines to operate in the on-board mode when the first mode determination device is instructed to operate in the reprogramming mode. The always-on power supply system micro-computer includes a first transition device that detects a change in a power supply state of the not-always-on power supply system micro-computer when the operation is carried out in the reprogramming mode and the control software is being rewritten. The first transition device switches a processing to a determination executed by the first mode determination device when the first transition device detects that the power supply state has changed.

As mentioned above, the present disclosure is provided with the not-always-on power supply system micro and the always-on power supply system micro. The always-on power supply system micro detects any change in the state of power supply to the not-always-on power supply system micro when control software is being rewritten. When the always-on power supply system micro detects any change in the state of power supply, it causes the processing to transition to determination by the first mode determination device.

For this reason, according the present disclosure, the following takes place when the state of power supply to the not-always-on power supply system micro changes from stopped state to supplied state while the always-on power supply system micro is carrying out rewrite processing: both the always-on power supply system micro and the not-always-on power supply system micro carry out determination by the first mode determination device. That is, according to the present disclosure, it is possible to synchronize the always-on power supply system micro and the not-always-on power supply system micro with respect to the timing of execution of determination by the first mode determination device.

Therefore, according to the present disclosure, the always-on power supply system micro does not instruct the not-always-on power supply system micro to operate in reprogramming mode even on the following occasion: when the state of power supply to the not-always-on power supply system micro changes from stopped state to supplied state while the always-on power supply system micro is carrying out rewrite processing. For this reason, according to the present disclosure, it is possible to suppress the not-always-on power supply system micro from operating in on-board mode while the always-on power supply system micro is carrying out rewrite processing. Consequently, according to the present disclosure, malfunction can be suppressed.

The always-on power supply system micro of the present disclosure carries out determination by the first mode determination device also on the following occasion: when the state of power supply to the not-always-on power supply system micro changes from supplied state to stopped state while the always-on power supply system micro is rewriting control software. At this time, the not-always-on power supply system micro of the present disclosure does not operate because power supply thereto has been stopped. Therefore, according to the present disclosure, it is possible to suppress the not-always-on power supply system micro from operating in on-board mode while the always-on power supply system micro is carrying out rewrite processing. Consequently, according to the present disclosure, malfunction can be suppressed.

BRIEF DESCRIPTION OF THE DRAWINGS

The above and other objects, features and advantages of the present disclosure will become more apparent from the following detailed description made with reference to the accompanying drawings. In the drawings:

FIG. 8 is a table indicating the combinations of instantaneous interruptions of power supply and the states of a flash ROM after the instantaneous interruptions in ECU;

DETAILED DESCRIPTION

First Embodiment

Hereafter, a description will be given to multiple embodiments for carrying out the invention with reference to the drawings. In the description of these embodiments, an example in which an electronic control unit of the present invention is applied to ECU 100 is taken. The ECU 100 is mounted in an object in which it is to be mounted. An example of the object in which it is to be mounted is a vehicle. In these embodiments, the ECU 100 is mounted in a vehicle. ECU is the abbreviation of Electronic Control Unit.

Figure 1:
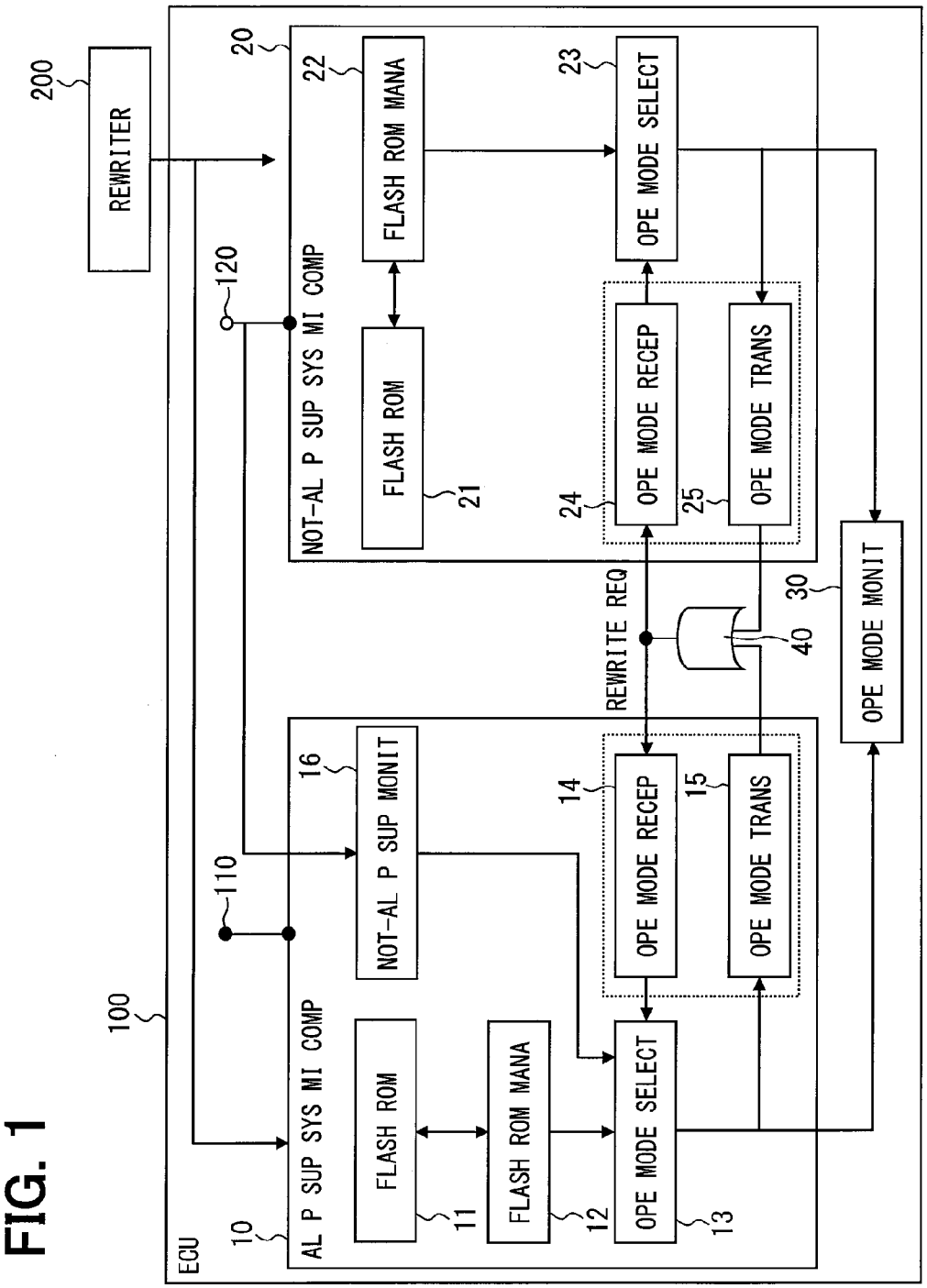
FIG. 1 is a block diagram illustrating the schematic configuration of ECU in an embodiment.

First, a description will be given to the configuration of the ECU 100 with reference to FIG. 1. The ECU 100 mainly includes an always-on power supply system micro-computer 10, a not-always-on power supply system micro-computer 20, an operating mode monitoring IC 30, a determination unit 40, and the like. The ECU 100 is connected with a rewriter 200. Hereafter, the always-on power supply system micro-computer may be referred to as always-on micro-computer and the not-always-on power supply system micro-computer may be referred to as not-always-on micro-computer. When the always-on micro-computer 10 and the not-always-on micro-computer 20 need not be discriminated from each other, they are also simply referred to as micro.

The rewriter 200 is connected with the always-on power supply system micro-computer 10 and not-always-on power supply system micro-computer 20 described later through a communication line. The rewriter 200 is an apparatus for rewiring control software stored in flash ROMs 11, 21 used in the always-on micro-computer 10 and the not-always-on micro-computer 20. For example, the rewriter 200 transmits new control software and a program for updating control software to the always-on micro-computer 10 and the not-always-on micro-computer 20.

The always-on micro-computer 10 includes an operation part, a storage part, and an input/output part, and the like. The always-on micro-computer 10 is connected with an always-on power source 110 and is always supplied with power. The always-on power source 110 includes, for example, the battery mounted in the vehicle and a power supply path connecting the battery and the always-on micro-computer 10 without intervention of the ignition switch. Therefore, the foregoing can be translated into that the always-on micro-computer 10 is constantly connected with the battery regardless of a user's manipulation and supplied with power from the battery. However, the always-on micro-computer 10 can have power supply thereto stopped instantaneously (in other words, only for a short time) because of any trouble in the always-on power source 110 or the like. That is, the always-on micro-computer 10 can have power supply thereto stopped due to a so-called instantaneous interruption. The battery is equivalent to power source. Start of power supply to a micro-computer that has had power supply thereto stopped can be translated into start-up of the micro-computer or start of the operation of the micro-computer.

The always-on micro-computer 10 includes a flash ROM 11, a flash ROM management part 12, an operating mode selection part 13, an operating mode reception part 14, an operating mode transmission part 15, a not-always-on power supply monitoring part 16, and the like.

The flash ROM 11 is included in the storage part of the always-on micro-computer 10. Though not shown in the drawing, the always-on micro-computer 10 may also include RAM or the like as well as the flash ROM 11 as a storage part. ROM is the abbreviation of Read Only Memory. RAM is the abbreviation of Random Access Memory.

The flash ROM 11 is equivalent to memory. The flash ROM 11 is a semiconductor memory which is rewritable and from which the contents thereof are not erased even when power supply thereto is stopped. In the flash ROM 11, control software and reprogramming software are stored. The flash ROM 11 may also be referred to as flash memory.

The always-on micro-computer 10 operates based on the control software and reprogramming software stored in the flash ROM 11. That is, the always-on micro-computer 10 operates in the following modes: control mode, an operating mode based on the control software; and reprogramming mode, an operating mode based on the reprogramming software, which is used to rewrite the control software stored in the flash ROM 11. In other words, the always-on micro-computer 10 operates in control mode and reprogramming mode by its own operation part carrying out arithmetic processing in accordance with the control software and reprogramming software stored in the flash ROM 11.

The control mode is an operating mode for carrying out control for vehicle operation. The reprogramming mode is for rewriting control software and it may also be referred to as rewrite mode or reprogramming mode. In more detail, the reprogramming mode is for reprogramming the ECU 100 mounted in the vehicle. When the always-on micro-computer 10 operates in reprogramming mode, it transmits a rewrite request from the operating mode transmission part 15. When either of the always-on micro-computer 10 and the not-always-on micro-computer 20 is carrying out rewrite processing, the other micro-computer (in other words, the micro-computer that is not carrying out rewrite processing) is brought into a stand-by state.

The always-on micro-computer 10 can operate in on-board mode as well as control mode and reprogramming mode. The on-board mode is an operating mode in which the ECU 100 operates as is removed from the vehicle, that is, the ECU 100 singly operates. In other words, on-board mode is for rewriting the flash ROM 11 in the separated ECU 100 with the rewriter 200 connected. Therefore, the ECU 100 does not operate in on-board mode as is mounted in a vehicle. As mentioned above, on-board mode is an operating mode that is not established with the ECU 100 mounted in the vehicle.

The on-board mode is for rewriting the flash ROM 11 like reprogramming mode. However, while reprogramming mode is established with the ECU 100 mounted in the vehicle, on-board mode is established with the ECU 100 removed from the vehicle. Therefore, reprogramming mode may also be referred to as on-vehicle reprogramming mode and on-board mode be referred to as on-board reprogramming mode. That is, when reprogramming mode is simply referred to in the description of these embodiments, it denotes on-vehicle reprogramming mode.

The flash ROM management part 12, operating mode selection part 13, and not-always-on power supply monitoring part 16 are included in the operation part of the always-on micro-computer 10. The operating mode reception part 14 and the operating mode transmission part 15 are included in the input/output part of the always-on micro-computer 10. In other words, the always-on micro-computer 10 includes the following as functional blocks that can be carried out by itself: the flash ROM management part 12, operating mode selection part 13, operating mode reception part 14, operating mode transmission part 15, and not-always-on power supply monitoring part 16.

The flash ROM management part 12 determines whether or not control software is being normally written to the flash ROM 11. For example, when an instantaneous interruption of power to the always-on micro-computer 10 while it is operating in reprogramming mode, it interrupts writing to the flash ROM 11. In this case, control software is not normally written to the flash ROM 11. That is, the state in which control software is not normally written to the flash ROM 11 can be translated into flash ROM anomaly. Therefore, the flash ROM management part 12 detects any flash ROM anomaly in the flash ROM 11.

The operating mode selection part 13 determines whether or not a rewrite request is present or the like and selects an operating mode based on the result of this determination and the like. In more detail, the operating mode selection part 13 selects any of control mode, reprogramming mode, and on-board mode as an operating mode according to the following: a rewrite request from the operating mode reception part 14 and the result of detection of a flash ROM anomaly at the flash ROM management part 12.

The operating mode reception part 14 receives a rewrite request from the not-always-on micro-computer 20. The operating mode reception part 14 receives a rewrite request received through the determination unit 40, which will be described later. The operating mode transmission part 15 transmits a rewrite request to the not-always-on micro-computer 20. The operating mode transmission part 15 transmits a rewrite request through the determination unit 40, which will be described later.

The not-always-on power supply monitoring part 16 detects any change in the state of power supply to the not-always-on micro-computer 20. That is, the not-always-on power supply monitoring part 16 determines the following: whether or not the state of power supply to the not-always-on micro-computer 20 has changed from supplied state to stopped state and whether or not the state of power supply to the not-always-on micro-computer 20 has changed from stopped state to supplied state. This can be translated into that the not-always-on power supply monitoring part 16 determines the following: whether or not power supply to the not-always-on micro-computer 20 has been stopped and whether or not power supply to the not-always-on micro-computer 20 that had been stopped has been started. The not-always-on micro-computer 20 is switched between power being supplied thereto and power supply thereto being stopped by turning on or off the ignition switch. Therefore, the foregoing can also be translated into that the not-always-on power supply monitoring part 16 determines whether or not the ignition switch has transitioned from on to off or off to on.

Like the always-on micro-computer 10, the not-always-on micro-computer 20 includes an operation part, a storage part, an input/output part, and the like. The not-always-on micro-computer 20 is connected with a not-always-on power source 120; and it is connected with a battery and has power supplied thereto by a user's manipulation and is disconnected from the battery and has power supply thereto stopped by a user's manipulation. The not-always-on power source 120 includes, for example, the battery mounted in the vehicle and a power supply path connecting the battery and the not-always-on micro-computer 20 through the ignition switch. Therefore, the not-always-on micro-computer 20 is connected with the battery and has power supplied thereto by a user turning the ignition switch on; and it is disconnected from the battery and has power supply thereto stopped by a user turning the ignition switch off. However, the not-always-on micro-computer 20 can has power supply thereto stopped by an instantaneous interruption due to trouble in the not-always-on power source 120 or the like regardless of the state of the ignition switch.

The not-always-on micro-computer 20 includes a flash ROM 21, a flash ROM management part 22, an operating mode selection part 23, an operating mode reception part 24, an operating mode transmission part 25, and the like.

The flash ROM 21 is equivalent to memory. Since the flash ROM 21 is identical with the flash ROM 11, a detailed description thereof will be omitted. The not-always-on micro-computer 20 may include RAM or the like as a storage part as well as the flash ROM 21.

Like the always-on micro-computer 10, the not-always-on micro-computer 20 operates based on the control software and reprogramming software stored in the flash ROM 21. That is, the not-always-on micro-computer 20 operates in the following modes: control mode, an operating mode based on the control software; and reprogramming mode, an operating mode based on the reprogramming software, which is used to rewrite the control software stored in the flash ROM 21. The not-always-on micro-computer 20 can operate in on-board mode as well as control mode and reprogramming mode.

The flash ROM management part 22 and the operating mode selection part 23 are included in the operation part of the not-always-on micro-computer 20. The operating mode reception part 24 and the operating mode transmission part 25 are included in the input/output part of the not-always-on micro-computer 20. In other words, the not-always-on micro-computer 20 includes the following as functional blocks that can be carried out by itself: the flash ROM management part 22, operating mode selection part 23, operating mode reception part 24, and operating mode transmission part 25. The flash ROM management part 22, operating mode selection part 23, operating mode reception part 24, and operating mode transmission part 25 are respectively identical with the following: the flash ROM management part 12, operating mode selection part 13, operating mode reception part 14, and operating mode transmission part 15. Therefore, a detailed description of the flash ROM management part 22, operating mode selection part 23, operating mode reception part 24, and operating mode transmission part 25 will be omitted.

The flash ROM management part 22 determines whether or not control software is being normally written to the flash ROM 21. For example, when an instantaneous interruption of power to the not-always-on micro-computer 20 while it is operating in reprogramming mode, it interrupts writing to the flash ROM 21. In this case, control software is not normally written to the flash ROM 21. That is, the state in which control software is not normally written to the flash ROM 21 can be translated into ROM anomaly. Therefore, the flash ROM management part 22 detects any flash ROM anomaly in the flash ROM 21.

The operating mode selection part 23 determines whether or not a rewrite request is present or the like and selects an operating mode based on the result of this determination and the like. In more detail, the operating mode selection part 23 selects any of control mode, reprogramming mode, and on-board mode as an operating mode according to the following: a rewrite request from the operating mode reception part 24 and the result of detection of a ROM anomaly at the flash ROM management part 22.

The operating mode reception part 24 receives a rewrite request from the always-on micro-computer 10. The operating mode reception part 24 receives a rewrite request received through the determination unit 40, which will be described later. The operating mode transmission part 25 transmits a rewrite request to the always-on micro-computer 10. The operating mode transmission part 25 transmits a rewrite request through the determination unit 40, which will be described later.

The operating mode monitoring IC 30 monitors the operating mode of each of the always-on micro-computer 10 and the not-always-on micro-computer 20. In other words, the operating mode monitoring IC 30 detects the following according to the operating mode of the always-on micro-computer 10 and the operating mode of the not-always-on micro-computer 20: whether or not the operating mode that won't be established on the vehicle, that is, on-board mode has been established. When the operating mode monitoring IC 30 detects that on-board mode has been established, it issues a reset to the always-on micro-computer 10 and the not-always-on micro-computer 20. When the operating mode monitoring IC 30 detects that on-board mode has been established with the ECU 100 mounted in the vehicle, it issues a reset to the always-on micro-computer 10 and the not-always-on micro-computer 20. When either of the always-on micro-computer 10 and the not-always-on micro-computer 20 is operating in on-board mode, the operating mode monitoring IC 30 issues a reset to the micro-computer that is operating in on-board mode.

In on-board reprogramming mode, the always-on micro-computer 10 and the not-always-on micro-computer 20 operate, for example, as firmware specific to micro-computer manufacturers. For this reason, the always-on micro-computer 10 or the not-always-on micro-computer 20 does not output a WDC signal or the like indicating that control s normal. Consequently, the ECU 100 detects any anomaly in the operation of the always-on micro-computer 10 and the not-always-on micro-computer 20 by the operating mode monitoring IC 30 having a hardware-like monitoring function. WDC is the abbreviation of Watch Dog Clear.

The always-on micro-computer 10 and the not-always-on micro-computer 20 could be made to monitor the state of each other's operation using a WDC signal or the like. However, if the always-on micro-computer 10 and the not-always-on micro-computer 20 cannot be synchronized with each other with respect to operating mode, that is, when one is in control mode and the other is in reprogramming mode, the monitoring system between them would collapse. For this reason, when the always-on micro-computer 10 and the not-always-on micro-computer 20 cannot be synchronized with each other with respect to operating mode, a reset is periodically issued due to stop of output of the WDC signal. As a result, the micro-computer operating in control mode determines that the state of the micro-computer operating in reprogramming mode is anomalous.

A determination unit 50 determines whether or not each of the always-on micro-computer 10 and the not-always-on micro-computer 20 is in reprogramming mode as control mode. The determination unit 50 makes determination based on a rewrite request to the always-on micro-computer 10 transmitted from the operating mode transmission part 25 and a rewrite request to the not-always-on micro-computer 20 transmitted from the operating mode transmission part 15. When either of the always-on micro-computer 10 and the not-always-on micro-computer 20 transmits a rewrite request, the determination unit 50 transmits a rewrite request to the always-on micro-computer 10 and the not-always-on micro-computer 20. When neither the always-on micro-computer 10 nor the not-always-on micro-computer 20 transmits a rewrite request, the determination unit 50 does not transmit a rewrite request to the always-on micro-computer 10 or the not-always-on micro-computer 20. For example, the operating mode transmission parts 15, 25 bring a request signal indicating a rewrite request to HIGH level to transmit the rewrite request; and they bring the request signal to LOW level not to transmit a rewrite request. This makes it possible for the ECU 100 to more easily synchronize the always-on micro-computer 10 and the not-always-on micro-computer 20 with each other with respect to operating mode.

However, in case of ECU including an always-on micro-computer and a not-always-on micro-computer, the following takes place when an instantaneous interruption or the like occurs in each micro-computer: start of power supply to these micro-computers can be brought out of sync. In other words, in case of ECU including an always-on micro-computer and a not-always-on micro-computer, the timing of start of the operation of each micro-computer can differ if an instantaneous interruption or the like occurs in each micro-computer.

A description will be given to the processing operation of the ECU 100 with reference to FIG. 2 to FIG. 7. First, the processing operation of the ECU 100 will be described using the flowcharts in FIG. 2 to FIG. 4.

Figure 2:
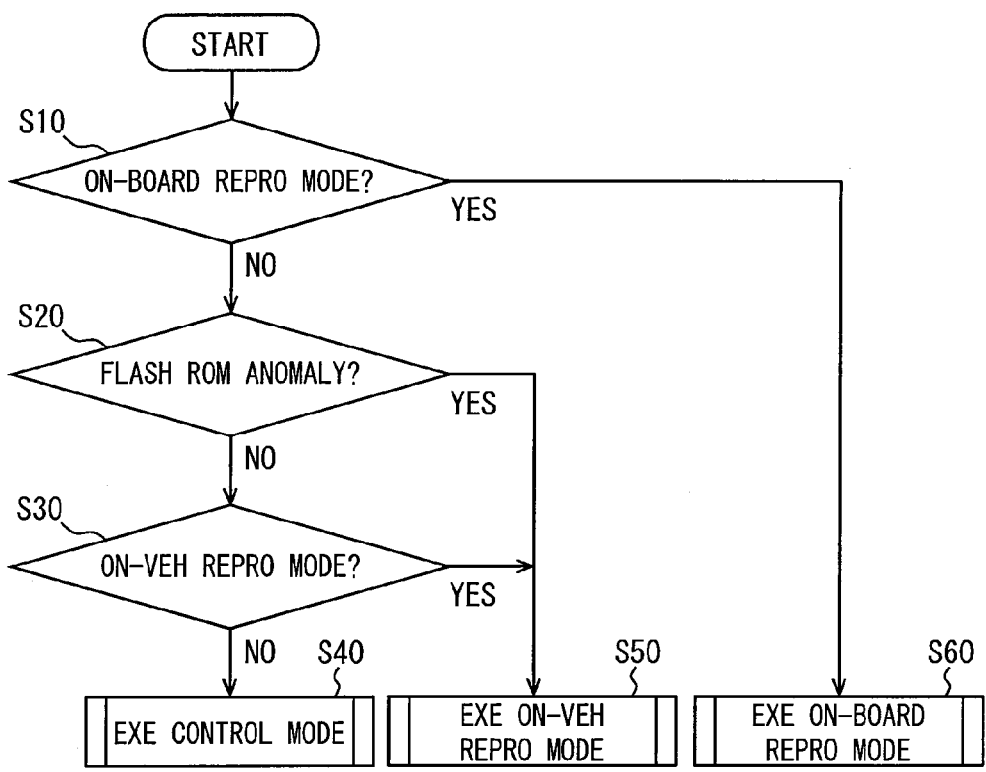
FIG. 2 is a flowchart showing the processing operation of each micro-computer in an embodiment.

When power supply to each of the always-on micro-computer 10 and the not-always-on micro-computer 20 is started, they carries out the processing shown in the flowchart in FIG. 2. However, the always-on micro-computer 10 and the not-always-on micro-computer 20 are different from each other in the details of the processing at Step S40 and Step S50. The not-always-on micro-computer 20 carries out control for vehicle operation at Step S40 and rewrites control software at Step S50. Meanwhile, the always-on micro-computer 10 carries out the determination shown as Step S41, in addition to control for vehicle operation, at Step S40 and carries out the determination shown as Step S51, in addition to rewriting control software, at Step S50. When power supply to each of the always-on micro-computer 10 and the not-always-on micro-computer 20 is stopped, they terminates the series of processing shown in the flowchart in FIG. 2.

At Step S10, the micro-computer determines whether or not operation should be carried out in on-board reprogramming mode (first mode determination device). Each of the operating mode selection parts 13, 23 determines whether or not operation should be carried out on board based on the presence/absence of a rewrite request external to the micro-computer. A more detailed description will be given. When there is not an instruction to operate in reprogramming mode, each of the operating mode selection parts 13, 23 determines that operation should not be carried out in on-board mode. When there is an instruction to operate in reprogramming mode, they determine that operation should be carried out in on-board mode. When it is determined that operation should not be carried out in on-board mode, each of the operating mode selection parts 13, 23 proceeds to Step S20. When it is determined that operation should be carried out in on-board mode, each of the operating mode selection parts 13, 23 proceeds to Step S60.

At Step S20, it is determined whether or not there is a flash ROM anomaly (second mode determination device). When at Step S10 it is determined that operation should not be carried out in on-board mode, each of the always-on micro-computer 10 and the not-always-on micro-computer 20 determines whether or not there is a flash ROM anomaly.

At this time, the flash ROM management part 12 determines whether or not control software is being normally written to the flash ROM 11. When the flash ROM management part 12 determines that control software is being normally written to the flash ROM 11, it considers that there is not a flash ROM anomaly. That is, when the flash ROM management part 12 determines that control software is being normally written to the flash ROM 11, it considers that the flash ROM 11 is normal. When the flash ROM management part 12 determines that control software is not being normally written to the flash ROM 11, it considers that there is a flash ROM anomaly. Similarly, the flash ROM management part 22 determines whether or not there is a flash ROM anomaly according to whether or not control software is being normally written to the flash ROM 21.

When each of the flash ROM management parts 12, 22 determines that there is not a flash ROM anomaly, they proceed to Step S30. When each of the flash ROM management parts 12, 22 determines that there is a flash ROM anomaly, they consider that operation should be carried out in reprogramming mode and proceeds to Step S50. As mentioned above, each of the always-on micro-computer 10 and the not-always-on micro-computer 20 determines whether or not operation should be carried out in reprogramming mode according to whether or not control software is being normally written to each of the flash ROMs 11, 21.

When each of the always-on micro-computer 10 and the not-always-on micro-computer 20 considers that operation should be carried out in reprogramming mode, it instructs the micro-computer other than itself to operate in reprogramming mode. For example, when the flash ROM management part 12 considers that operation should be carried out in reprogramming mode, the operating mode transmission part 15 transmits a rewrite request to the not-always-on micro-computer 20; and it thereby instructs the same to operate in reprogramming mode.

At Step S30, it is determined whether or not operation should be carried out in on-vehicle reprogramming mode (third mode determination device). When at Step S20 it is determined that operation should not be carried out in reprogramming mode, each of the always-on micro-computer 10 and the not-always-on micro-computer 20 determines whether or not operation should be carried out in control mode. At this time, each of the operating mode selection parts 13, 23 determines whether or not operation should be carried out in control mode based on the presence/absence of a switching request from the determination unit 40. When each of the operating mode selection parts 13, 23 determines that operation should not be carried out in control mode, they proceed to Step S50. When they determine that operation should be carried out in control mode, they proceed to Step S40. It is desirable that each of the operating mode selection parts 13, 23 should carry out the determination at Step S30 after they wait for a certain period of time after the determination of NO at Step S20. This makes it possible to reliably receive the output of a rewrite request signal on the other side as indicated at time t14 in FIG. 6 and time t24 in FIG. 7.

At Step S40, each of the always-on micro-computer 10 and the not-always-on micro-computer 20 operates in control mode. At Step S50, each of the always-on micro-computer 10 and the not-always-on micro-computer 20 operates in reprogramming mode. At Step S60, each of the always-on micro-computer 10 and the not-always-on micro-computer 20 operates in on-board mode.

Figure 3:
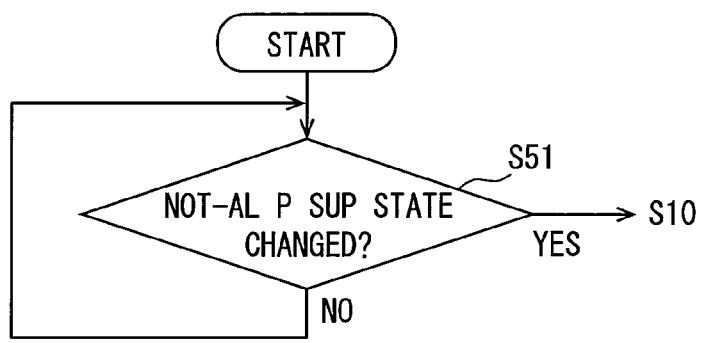
FIG. 3 is a flowchart showing the processing operation of an always-on power supply system micro-computer in on-vehicle reprogramming mode in an embodiment.

A description will be given to the processing operation of the always-on micro-computer 10 in reprogramming mode with reference to FIG. 3. While the always-on micro-computer 10 is operating in reprogramming mode, it carries out determination of Step S51.

At Step S51, it determines whether or not the state of the not-always-on power source has changed (first transition device). At this time, the not-always-on power supply monitoring part 16 detects any change in the state of power supply to the not-always-on micro-computer 20. In other words, the not-always-on power supply monitoring part 16 detects start-up and falling of the not-always-on micro-computer 20.

When the not-always-on power supply monitoring part 16 detects that the state of power supply has changed, it causes the processing to transition (in other words, shift the processing) to the determination at Step S10. That is, when the always-on micro-computer 10 detects that the state of power supply to the not-always-on micro-computer 20 has changed while it is operating (carrying out rewrite processing) in reprogramming mode, it carries out the following processing: it initializes it to the state immediately before power supply to itself is started. When the not-always-on power supply monitoring part 16 does not detect any change in the state of power supply, it repeatedly carries out the processing of Step S51.

Figure 4:
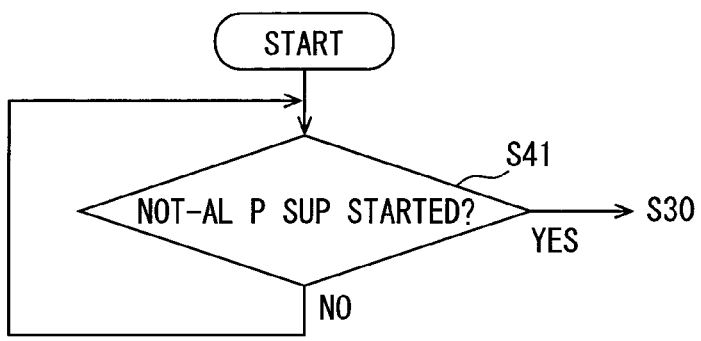
FIG. 4 is a flowchart showing the processing operation of an always-on power supply system micro-computer in control mode in an embodiment.

A description will be given to the processing operation of the always-on micro-computer 10 in control mode with reference to FIG. 4. While the always-on micro-computer 10 is operating in control mode, it carries out determination of Step S41.

At Step S41, it determines rise of the not-always-on power source (second transition device). At this time, the not-always-on power supply monitoring part 16 detects whether or not the state of power supply to the not-always-on micro-computer 20 has changed from stopped state to supplied state.

When the not-always-on power supply monitoring part 16 detects that the state of power supply to the not-always-on micro-computer 20 has changed from stopped state to supplied state, it causes the processing to transition to determination of Step S30. When the not-always-on power supply monitoring part 16 does not detect that the state of power supply to the not-always-on micro-computer 20 has changed from stopped state to supplied state, it repeatedly carries out the processing of Step S41.

Figure 9:
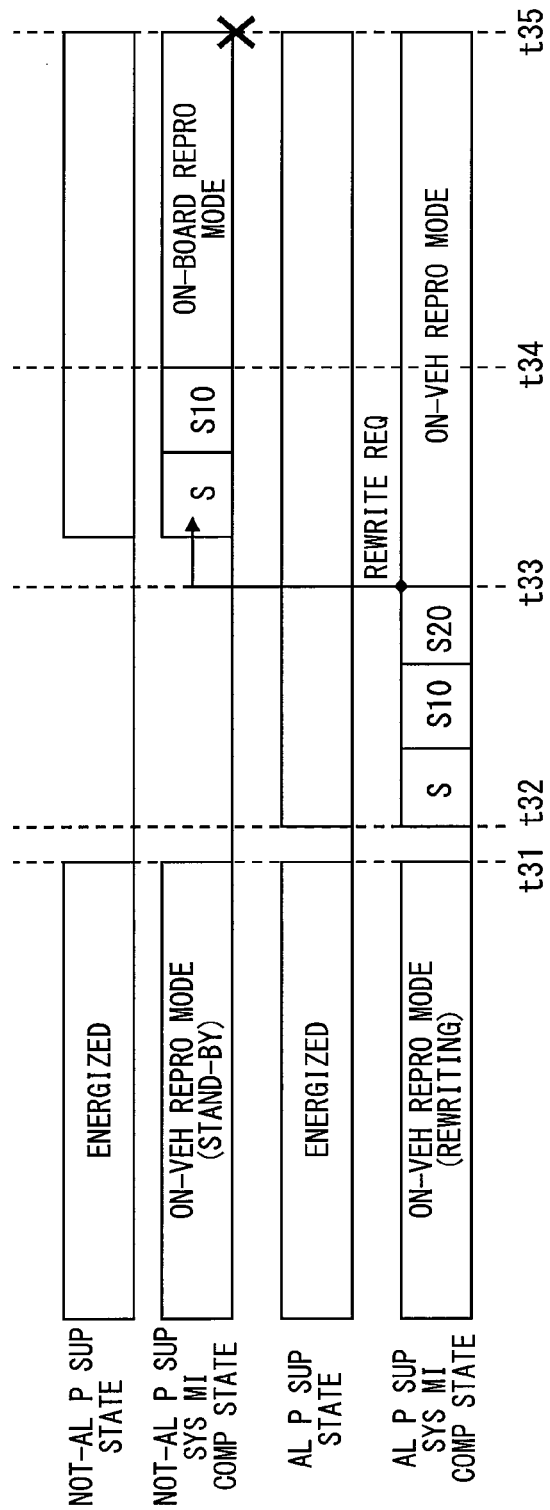
FIG. 9 is a timing diagram indicating the processing operation of ECU in a comparative example, taking place when an instantaneous interruption of power to an always-on micro-computer occurs while the always-on micro-computer is rewriting a flash ROM.
Figure 10:
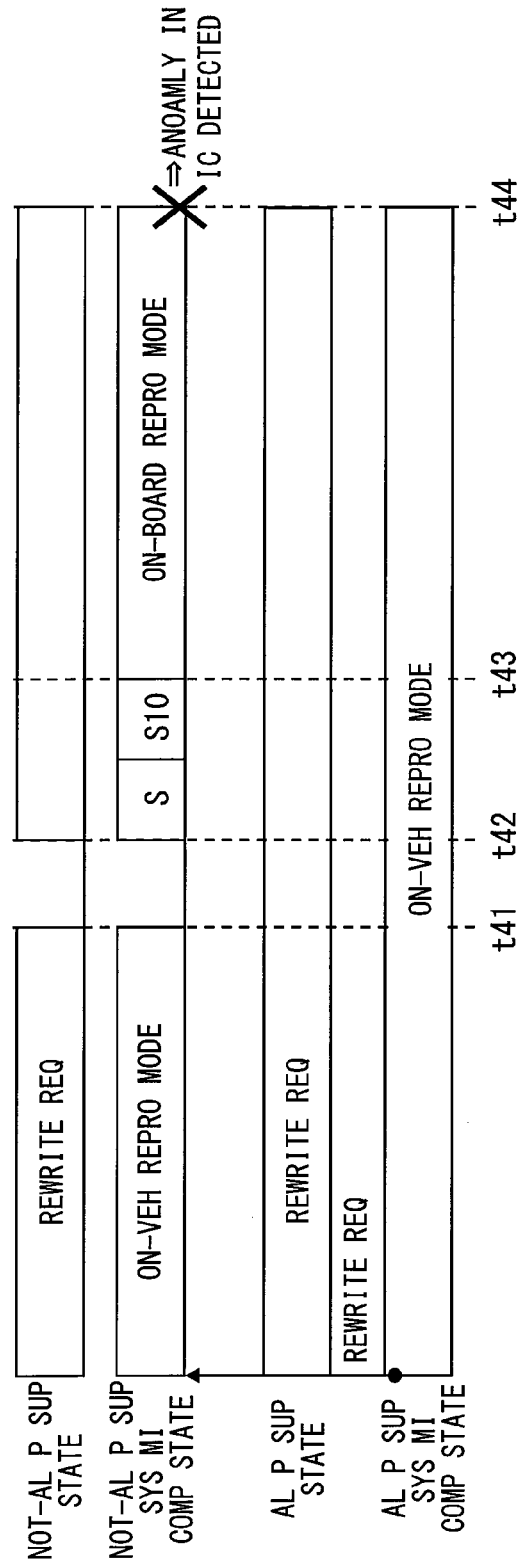
FIG. 10 is a timing diagram indicating the processing operation of ECU in a comparative example, taking place when an instantaneous interruption of power to a not-always-on micro-computer occurs while the not-always-on micro-computer is rewriting a flash ROM.
Figure 11:
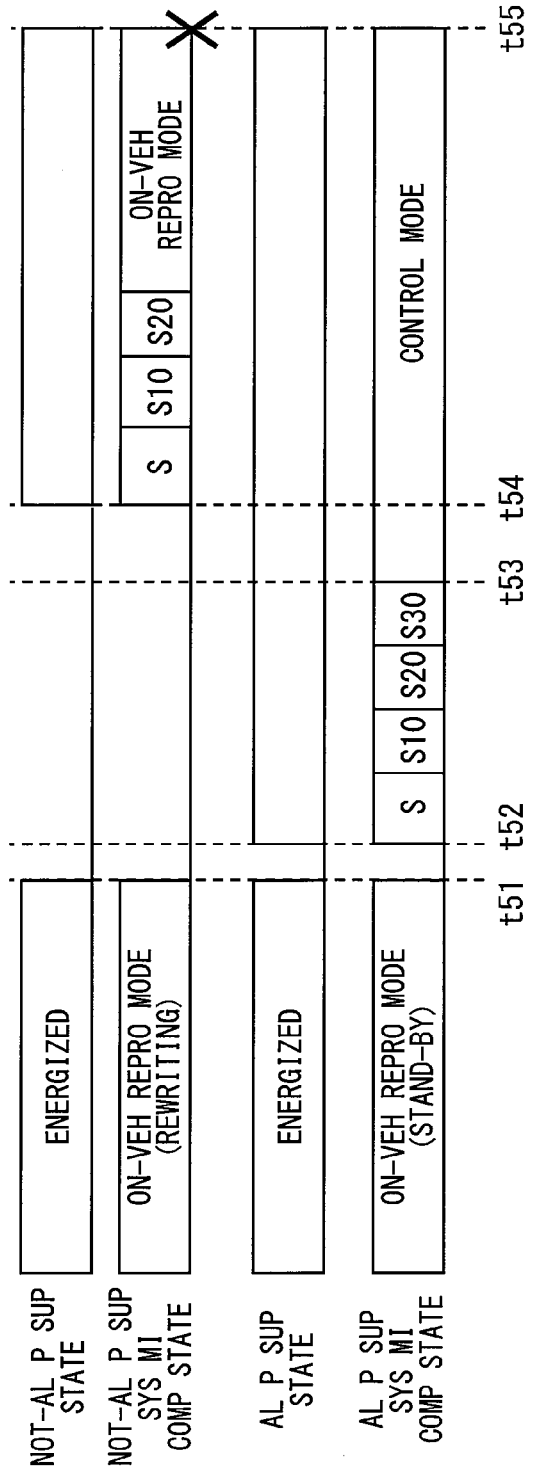
FIG. 11 is a timing diagram indicating the processing operation of ECU in a comparative example, taking place when an instantaneous interruption of power to an always-on micro-computer occurs while a not-always-on micro-computer is rewriting a flash ROM.

A description will be given to the processing operation of the ECU 100 using the timing diagrams in FIG. 5 to FIG. 7. Here, the processing operation of the ECU 100 will be described through comparison with the processing operation of ECU in a comparative example using FIG. 9 to FIG. 11, which are timing diagrams indicating the processing operation of the ECU in the comparative example.

Like the ECU 100, the ECU in the comparative example includes an always-on micro-computer and a not-always-on micro-computer and carries out the same processing as shown in the flowchart in FIG. 2. In the ECU in the comparative example, however, not only the not-always-on micro-computer but also the always-on micro-computer does not carry out determination of Step S41 or Step S51.

In the ECU 100 and the ECU in the comparative example including an always-on micro-computer and a not-always-on micro-computer, the combinations of instantaneous power interruptions and the states of the flash ROMs after the instantaneous interruptions shown in FIG. 8 can occur.

The first combination is equivalent to a case where an instantaneous interruption of power to the always-on micro-computer occurs while the not-always-on micro-computer is rewriting the flash ROM. In this case, the state of the flash ROM after the instantaneous interruption is not-always-on micro-computer software anomaly. That is, control software for the not-always-on micro-computer is not normally written to the flash ROM.

The second combination is equivalent to a case where an instantaneous interruption of power to the not-always-on micro-computer occurs while the not-always-on micro-computer is rewriting the flash ROM. In this case, the state of the flash ROM after the instantaneous interruption is not-always-on micro-computer software anomaly. That is, control software for the not-always-on micro-computer is not properly written to the flash ROM.

The third combination is equivalent to a case where an instantaneous interruption of power to the always-on micro-computer occurs while the always-on micro-computer is rewriting the flash ROM. In this case, the state of the flash ROM after the instantaneous interruption is always-on micro-computer software anomaly. That is, control software for the always-on micro-computer is not normally written to the flash ROM.

The fourth combination is equivalent to a case where an instantaneous interruption of power to the not-always-on micro-computer occurs while the always-on micro-computer is rewriting the flash ROM. In this case, the state of the flash ROM of the instantaneous interruption is not always-on micro-computer software anomaly or not-always-on micro-computer software anomaly. That is, the state in which control software for the always-on micro-computer or control software for the not-always-on micro-computer is not normally written is not caused by an instantaneous interruption of power to the not-always-on micro-computer.

There is apprehension that the ECU in the comparative example becomes anomalous in any of the four combinations. A detailed description will be given to these four cases using the timing diagrams.

First, a description will be given to the third combination. When an instantaneous interruption of power to the always-on micro-computer occurs while the always-on micro-computer is rewriting the flash ROM, the ECU in the comparative example operates as shown in the timing diagram in FIG. 9.

When an instantaneous interruption of power to the always-on micro-computer occurs while the always-on micro-computer is carrying out rewrite processing as shown at time t31, the following takes place in the ECU in the comparative example: rewrite processing is interrupted in all the micro-computers. That is, the rewrite processing is interrupted in not only the always-on micro-computer but also the not-always-on micro-computer.

When power supply to the always-on micro-computer is thereafter restored as shown at time t32, the reset is removed from the always-on micro-computer and it starts (S) the processing in the flowchart in FIG. 2. At this time, the not-always-on micro-computer has had power supply thereto stopped. Therefore, the always-on micro-computer proceeds to Step S20, following Step S10.

At the determination of Step S20, the always-on micro-computer detects an anomaly in the flash ROM as shown at time t33 and it proceeds to the reprogramming mode at Step S50 and resumes rewriting the flash ROM. Since the always-on micro-computer operates in reprogramming mode, it transmits a rewrite request as shown at time t33. As a result, the rewrite request is transmitted to the not-always-on micro-computer.

When power supply is thereafter started, the not-always-on micro-computer starts (S) the processing in the flowchart in FIG. 2. At this time, the rewrite request has been already transmitted to the not-always-on micro-computer at time t33. For this reason, at Step S10 the not-always-on micro-computer determines that operation should be carried out in on-board mode as shown at time t34. Consequently, the not-always-on micro-computer proceeds to on-board mode of Step S60. That is, the not-always-on micro-computer enters on-board mode though the ECU in the comparative example is operating in the vehicle. As a result, the operating mode monitoring IC detects that the operation is in on-board mode as shown at time t35 and issues a reset to the not-always-on micro-computer.

Figure 5:
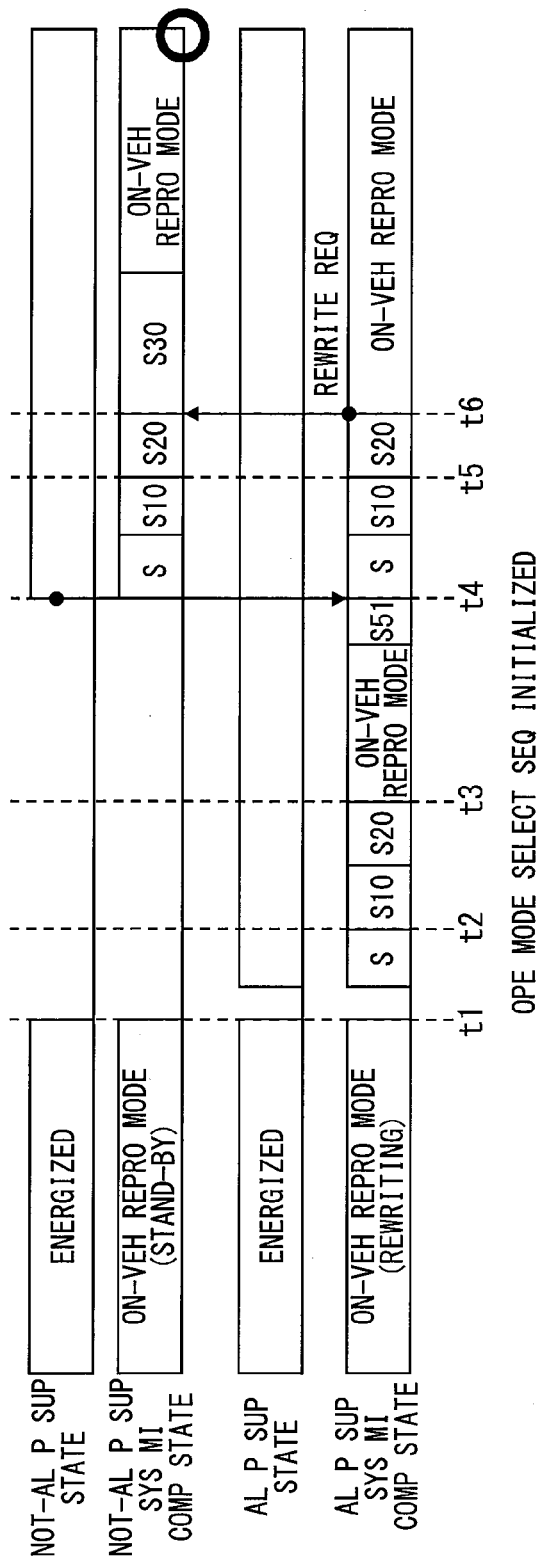
FIG. 5 is a timing diagram indicating the processing operation of ECU in an embodiment, taking place when an instantaneous interruption of power to an always-on micro-computer occurs while the always-on micro-computer is rewriting a flash ROM.

Meanwhile, the ECU 100 operates as shown in the timing diagram in FIG. 5. When an instantaneous interruption of power to the always-on micro-computer occurs while the always-on micro-computer 10 is carrying out rewrite processing as shown at time t1, the rewiring processing of every micro-computer is interrupted in the ECU 100. That is, rewrite processing is interrupted in not only the always-on micro-computer 10 but also the not-always-on micro-computer 20.

When power supply to the always-on micro-computer is thereafter restored as shown at time t2, the reset is removed from the always-on micro-computer 10 and it starts (S) the processing in the flowchart in FIG. 2. At this time, the not-always-on micro-computer 20 has had power supply thereto stopped. Therefore, the always-on micro-computer 10 proceeds to Step S20, following Step S10.

In the determination at Step S20, the always-on micro-computer 10 detects an anomaly in the flash ROM and proceeds to reprogramming mode at Step S50 as shown at time t3 and resumes rewriting the flash ROM. Further, while the always-on micro-computer 10 is operating in reprogramming mode, the not-always-on power supply monitoring part 16 detects any change in the state of power supply to the not-always-on micro-computer 20 (Step S51).

When power supply is thereafter started, as shown at time t4, the not-always-on micro-computer 20 starts (S) the processing in the flowchart in FIG. 2. In the always-on micro-computer 10, at this time, the not-always-on power supply monitoring part 16 detects change in the state of power supply to the not-always-on micro-computer 20, that is, start-up of the not-always-on micro-computer 20 at Step S51. Therefore, as the result of the state of power supply to the not-always-on micro-computer 20 changing while the always-on micro-computer 10 is operating in reprogramming mode, it initializes it to the state immediately before power supply to itself is started. That is, the always-on micro-computer 10 starts (S) the processing in the flowchart in FIG. 2. Then the always-on micro-computer 10 carries out the processing of Step S10 again. In other words, the always-on micro-computer 10 transitions from reprogramming mode at Step S50 to Step S10 again.

As a result, the always-on micro-computer 10 and the not-always-on micro-computer 20 carry out Step S10 in the flowchart in FIG. 2. As mentioned above, the ECU 100 can synchronize the always-on micro-computer 10 and the not-always-on micro-computer 20 with each other with respect to operating mode.

Since each of the always-on micro-computer 10 and the not-always-on micro-computer 20 is not instructed to operate in reprogramming mode, at Step S10 it determines that operation should not be carried out in on-board mode as shown at time t5. Consequently, each of the always-on micro-computer 10 and the not-always-on micro-computer 20 proceeds to Step S20.

Since the not-always-on micro-computer 20 does not detect any flash ROM anomaly at Step S20, it proceeds to the determination of Step S30. Meanwhile, the always-on micro-computer 10 detects an anomaly in the flash ROM in the determination at Step S20 and proceeds to reprogramming mode of Step S50 and resumes rewriting the flash ROM 11. Thus the always-on micro-computer 10 can rewrite the flash ROM 11 again. Since the always-on micro-computer 10 operates in reprogramming mode, it transmits a rewrite request as shown at time t6. That is, the not-always-on micro-computer 20 has the rewrite request transmitted thereto as shown at time t6.

Unlike the ECU in the comparative example, at this time, the not-always-on micro-computer 20 has completed the determination of Step S20; therefore, it does not enter on-board mode. Since the not-always-on micro-computer 20 receives a switching request from the determination unit 40 in the determination at Step S30, it proceeds to reprogramming mode of Step S50. In other words, since the not-always-on micro-computer 20 detects a switching request in the determination of Step S30, it shifts to reprogramming mode. As a result, the flash ROM 21 can be rewritten also in the not-always-on micro-computer 20. As mentioned above, the not-always-on micro-computer 20 has competed the determination of Step S10 before the always-on micro-computer 10 issues a rewrite request and thus it can transition to on-vehicle mode in the determination of Step S30.

A description will be given to the second and fourth combinations. When an instantaneous interruption of power to the not-always-on micro-computer occurs while either the always-on micro-computer or the not-always-on micro-computer is rewriting its flash ROM, the ECU in the comparative example operates as shown in the timing diagram in FIG. 10.

When an instantaneous interruption of power to the not-always-on micro-computer occurs as shown at time t41 while the not-always-on micro-computer is carrying out write processing, the rewriting processing of the not-always-on micro-computer is interrupted. Meanwhile, the always-on micro-computer continues reprogramming mode. That is, rewrite processing is interrupted only in the not-always-on micro-computer.

When power supply to the not-always-on micro-computer is thereafter restored as shown at time t42, the reset is removed from the not-always-on micro-computer and it starts (S) the processing in the flowchart in FIG. 2. At this time, the always-on micro-computer is operating in reprogramming mode and thus it transmits a rewrite request. As a result, the rewrite request is transmitted to the not-always-on micro-computer.

For this reason, as shown at time t43, the not-always-on micro-computer determines that operation should be carried out in on-board mode at Step S10. Consequently, the not-always-on micro-computer proceeds to on-board mode of Step S60. That is, though the ECU in the comparative example is operating in the vehicle, the not-always-on micro-computer enters on-board mode. As a result, the operating mode monitoring IC detects that operation is being carried out in on-board mode as shown at time t44 and it issues a reset to the not-always-on micro-computer.

Also when an instantaneous interruption of power to the not-always-on micro-computer occurs at time t41 while the always-on micro-computer is carrying out rewrite processing, the following similarly takes place: the always-on micro-computer continues rewrite processing but the not-always-on micro-computer is brought into an instantaneous interruption state. When power supply to the not-always-on micro-computer is thereafter restored at time t42, the reset is removed from the not-always-on micro-computer. Therefore, when power supply is started, the not-always-on micro-computer starts (S) the processing in the flowchart in FIG. 2. At this time, the not-always-on micro-computer has had a rewrite request transmitted thereto at time t42. For this reason, as shown at time t43, the not-always-on micro-computer determines that operation should be carried out in on-board mode at Step S10. As a result, the not-always-on micro-computer proceeds to on-board mode of Step S60. That is, though the ECU in the comparative example is operating in the vehicle, the not-always-on micro-computer enters on-board mode. As a result, the operating mode monitoring IC detects that operation is being carried out in on-board mode at time t44 and it issues a reset to the not-always-on micro-computer.

Figure 6:
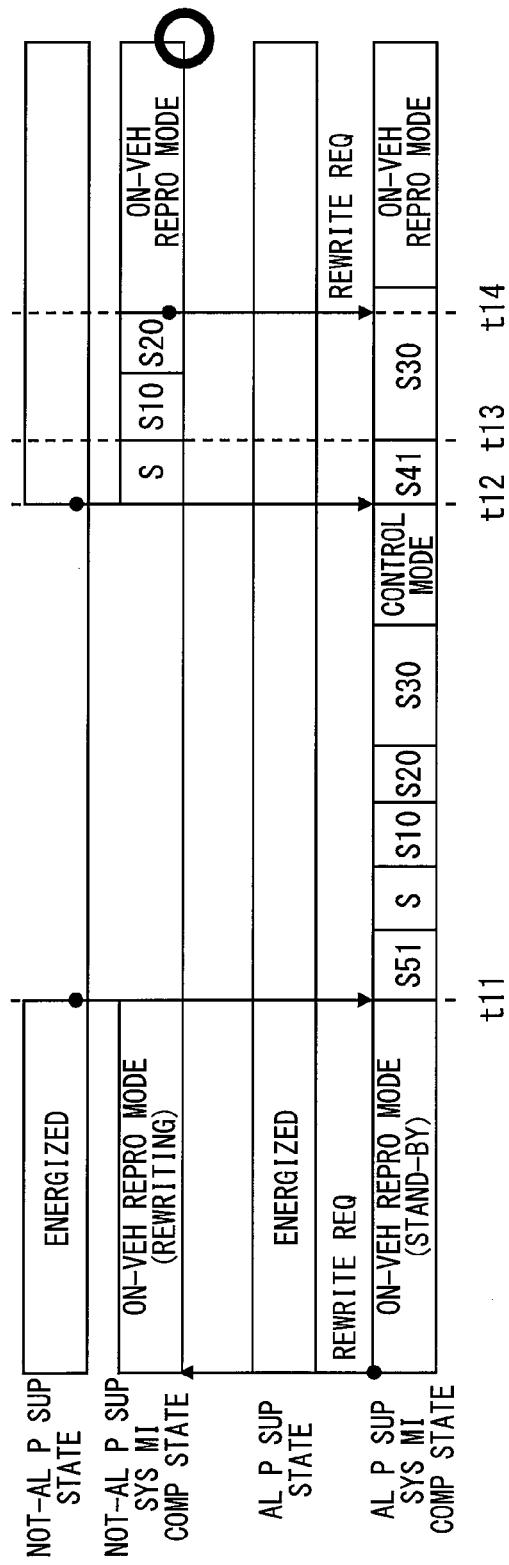
FIG. 6 is a timing diagram indicating the processing operation of ECU in an embodiment, taking place when an instantaneous interruption of power to a not-always-on micro-computer while the not-always-on micro-computer is rewriting a flash ROM.

Meanwhile, the ECU 100 operates as shown in the timing diagram in FIG. 6. When an instantaneous interruption of power to the not-always-on micro-computer 20 occurs as shown at time t11 while the not-always-on micro-computer 20 is carrying out rewrite processing, the rewrite processing of the not-always-on micro-computer 20 is interrupted.

Meanwhile, in the always-on micro-computer 10, at Step S51 the not-always-on power supply monitoring part 16 detects change in the state of power supply to the not-always-on micro-computer 20, that is, falling of the not-always-on micro-computer 20 (Step S51). Therefore, as the result of the state of power supply to the not-always-on micro-computer 20 changing while the always-on micro-computer 10 is operating in reprogramming mode, it initializes it to the state immediately before power supply to itself is started (Step S51). That is, the always-on micro-computer 10 starts (S) the processing in the flowchart in FIG. 2. Then the always-on micro-computer 10 carries out the processing of Step S10 again. In other words, the always-on micro-computer 10 transitions from reprogramming mode of Step S50 to Step S10 again. The always-on micro-computer 10 thereafter carries out the processing of Step S10 to Step S30 and operates in control mode at Step S40. Further, in the always-on micro-computer 10 in control mode, the not-always-on power supply monitoring part 16 detects whether or not the state of power supply to the not-always-on micro-computer 20 has changed from stopped state to supplied state (Step S41).

As the result of the state of power supply to the not-always-on micro-computer 20 changing from stopped state to supplied state as shown at times t12, t13 while the always-on micro-computer 10 is operating in control mode, it transitions to Step S30.

Meanwhile, when power supply to the not-always-on micro-computer 20 is restored as shown at time t12, the reset is removed therefrom and it starts (S) the processing in the flowchart in FIG. 2. At this time, the always-on micro-computer 10 is not operating in reprogramming mode and it does not transmit a rewrite request. For this reason, the not-always-on micro-computer 20 does not transition to on-board mode but transitions to Step S20.

Thereafter, the not-always-on micro-computer 20 detects an anomaly in the flash ROM in the determination at Step S20 as shown at time t14 and proceeds to reprogramming mode of Step S50 and resumes rewriting the flash ROM 21. As a result, the not-always-on micro-computer 20 can rewrite the flash ROM 21 again. Since the not-always-on micro-computer 20 operates in reprogramming mode, it transmits a rewrite request as shown at time t14. That is, the always-on micro-computer 10 has the rewrite request transmitted thereto as shown at time t14.

Consequently, the always-on micro-computer 10 receives a switching request from the determination unit 40 in the determination at Step S30 and thus it proceeds to reprogramming mode of Step S50. In other words, the always-on micro-computer 10 detects a switching request in the determination at Step S30; therefore, it shifts to reprogramming mode. Thus the flash ROM 11 can be rewritten also in the always-on micro-computer 10. After the not-always-on micro-computer 20 is started, as mentioned above, the always-on micro-computer 10 detects a rewrite request in the determination at Step S30 again and can transition to reprogramming mode.

As mentioned above, the always-on micro-computer 10 is so configured that the not-always-on power supply monitoring part 16 detects any change in the state of power supply to the not-always-on micro-computer 20 while it is rewriting the control program. Therefore, when an instantaneous interruption of power to the not-always-on micro-computer 20 occurs at time t11 while the always-on micro-computer 10 is carrying out rewrite processing, the following takes place in the always-on micro-computer 10: the not-always-on power supply monitoring part 16 detects that the state of power supply to the not-always-on micro-computer 20 has changed from supplied state to stopped state. In this case, it is desirable that the always-on micro-computer 10 should interrupt rewriting its own control software, that is, rewriting the flash ROM 11.

This makes it possible to suppress control software from being updated only in the always-on micro-computer 10. That is, a discrepancy in control software can be suppressed from occurring between the always-on micro-computer 10 and the not-always-on micro-computer 20. In other words, the following situation can be suppressed from occurring: a situation in which while the always-on micro-computer 10 continues to rewrite control software and the control software is updated, control software is not updated in the not-always-on micro-computer 20.

A description will be given to the first combination. When an instantaneous interruption of power to the always-on micro-computer occurs while the not-always-on micro-computer is rewriting the flash ROM, the ECU in the comparative example operates as shown in the timing diagram in FIG. 11.

When an instantaneous interruption of power to the always-on micro-computer occurs as shown at time t51 while the not-always-on micro-computer is carrying out rewrite processing, rewrite processing is interrupted in every micro-computer in the ECU in the comparative example. That is, rewrite processing is interrupted in not only the not-always-on micro-computer but also the always-on micro-computer. However, since the always-on micro-computer is not rewriting the flash ROM at this time, a flash ROM anomaly does not occur.

When power supply to the always-on micro-computer is thereafter restored as shown at time t52, the reset is removed from the always-on micro-computer and it starts (S) the processing in the flowchart in FIG. 2. At this time, the not-always-on micro-computer has had power supply thereto stopped. Consequently, the always-on micro-computer proceeds to Step S20, following Step S10. Since the always-on micro-computer does not detect any anomaly in the flash ROM in the determination at Step S20, it proceeds to Step S30. Further, since power supply to the not-always-on micro-computer has been stopped and the always-on micro-computer does not receive a rewrite request at Step S30, it proceeds to control mode of Step S40.

When power supply is thereafter started, the not-always-on micro-computer starts (S) the processing in the flowchart in FIG. 2. At this time, the always-on micro-computer is operating in control mode. For this reason, the not-always-on micro-computer proceeds to Step S20. Further, the not-always-on micro-computer detects a flash ROM anomaly in the determination at Step S20 and proceeds to reprogramming mode of Step S50 and resumes rewriting the flash ROM. While the always-on micro-computer is operating in control mode at this time, the not-always-on micro-computer operates in reprogramming mode. For this reason, the always-on micro-computer detects an anomaly in the state of the not-always-on micro-computer.

Figure 7:
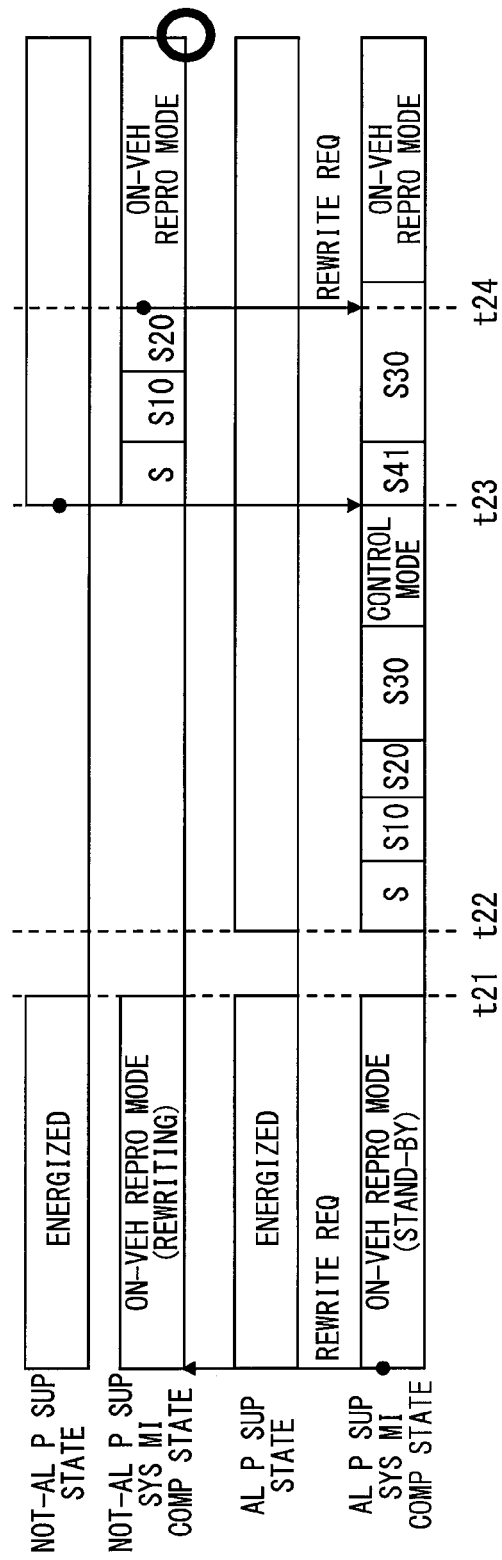
FIG. 7 is a timing diagram indicating the processing operation of ECU in an embodiment, taking place when an instantaneous interruption of power to an always-on micro-computer while a not-always-on micro-computer is rewriting a flash ROM.

Meanwhile, the ECU 100 operates as shown in the timing diagram in FIG. 7. When an instantaneous interruption of power to the not-always-on micro-computer 20 occurs as shown at time t11 while the not-always-on micro-computer 20 is carrying out rewrite processing, the rewrite processing of the not-always-on micro-computer 20 is interrupted.

When an instantaneous interruption of power to the always-on micro-computer 10 occurs as shown at time t21 while the not-always-on micro-computer 20 is carrying out rewrite processing, the rewrite processing of every micro-computer is interrupted in the ECU 100. That is, rewrite processing is interrupted in not only the not-always-on micro-computer 20 but also the always-on micro-computer 10. However, since the always-on micro-computer 10 is not rewriting the flash ROM at this time, a flash ROM anomaly does not occur.

When power supply to the always-on micro-computer is thereafter restored as shown at time t22, the always-on micro-computer 10 proceeds to control mode of Step S40 similarly to the always-on micro-computer in the ECU in the comparative example. Further, in the always-on micro-computer 10 in control mode, the not-always-on power supply monitoring part 16 detects whether or not the state of power supply to the not-always-on micro-computer 20 has changed from stopped state to supplied state (Step S41).

As the result of the state of power supply to the not-always-on micro-computer 20 changing from stopped state to supplied state as shown at time t23 while the always-on micro-computer 10 is operating in control mode, it transitions to Step S30.

When power supply is started, meanwhile, the not-always-on micro-computer 20 starts (S) the processing in the flowchart in FIG. 2. Since the always-on micro-computer 10 is not operating in reprogramming mode at this time, it does not transmit a rewrite request. For this reason, the not-always-on micro-computer 20 does not transition to on-board mode but transitions to Step S20.

Thereafter, the not-always-on micro-computer 20 detects a flash ROM anomaly in the determination at Step S20 as shown at time t24 and proceeds to reprogramming mode of Step S50 and resumes rewriting the flash ROM 21. As a result, the not-always-on micro-computer 20 can rewrite the flash ROM 21 again. Since the not-always-on micro-computer 20 operates in reprogramming mode, it transmits a rewrite request as shown at time t24. That is, the always-on micro-computer 10 has the rewrite request transmitted thereto as shown at time t24.

At this time, the always-on micro-computer 10 is not operating in control mode. For this reason, the always-on micro-computer 10 receives a switching request from the determination unit 40 in the determination at Step S30 and thus it proceeds to reprogramming mode of Step S50. In other words, the always-on micro-computer 10 detects a switching request in the determination at Step S30 and thus it shifts to reprogramming mode. As a result, the always-on micro-computer 10 also shifts to reprogramming mode and is brought into such a state that the flash ROM 11 can be rewritten. As mentioned above, after the not-always-on micro-computer 20 is started, the always-on micro-computer 10 detects a rewrite request in the determination at Step S30 again and can transition to reprogramming mode.

As described up to this point, the ECU 100 includes the always-on micro-computer 10 and the not-always-on micro-computer 20. While the always-on micro-computer 10 is rewriting control software, it detects any change in the state of power supply to the not-always-on micro-computer. When the always-on micro-computer 10 detects change in the state of power supply, it causes the processing to transition to determination of Step S10.

For this reason, when the state of power supply to the not-always-on micro-computer 20 changes from stopped state to supplied state while the always-on micro-computer 10 is carrying out rewrite processing, the following takes place in the ECU 100: both the always-on micro-computer 10 and the not-always-on micro-computer 20 carry out the determination of Step S10. That is, the ECU 100 can synchronize the always-on micro-computer 10 and the not-always-on micro-computer 20 with each other with respect to the timing of execution of the determination of Step S10.

Therefore, in the ECU 100, the following takes place even when the state of power supply to the not-always-on micro-computer 20 changes from stopped state to supplied state while the always-on micro-computer 10 is carrying out rewrite processing: the always-on micro-computer 10 does not instruct the not-always-on micro-computer 20 to operate in reprogramming mode. For this reason, in the ECU 100, the not-always-on micro-computer 20 can be suppressed from operating in on-board mode while the always-on micro-computer 10 is carrying out rewrite processing. Consequently, in the ECU 100, malfunction can be suppressed.

Also when the state of power supply to the not-always-on micro-computer 20 changes from supplied state to stopped state while the always-on micro-computer 10 is rewriting control software, it carries out the determination of Step S10. Since power supply is stopped at this time, the not-always-on micro-computer 20 does not operate. Therefore, in the ECU 100, the not-always-on micro-computer 20 can be suppressed from operating in on-board mode while the always-on micro-computer is carrying out rewrite processing. Consequently, in the ECU 100, malfunction can be suppressed.

That is, in ECU including an always-on micro-computer and a not-always-on micro-computer, the timing of start, that is, rising of power supply differs. In the ECU 100, the micro-computers can be suppressed from transitioning to on-board mode because of the difference in rising at the time of retry (time of re-rewriting) after the always-on micro-computer 10 fails to rewrite due to an instantaneous power interruption. This makes it possible for the ECU 100 to normally carry out transition to reprogramming mode at the time of retry.

Further, the ECU 100 can also cope with retry after failure in rewriting at the not-always-on micro-computer 2 by detecting start-up of the not-always-on micro-computer 20 while the always-on micro-computer 10 is operating in control mode and transitioning to the determination of Step S30.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electronic control unit mounted in an object comprising:
    a rewritable memory that stores control software and reprogramming software;
    a not-always-on power supply system micro-computer that operates in a control mode as an operating mode based on the control software and in a reprogramming mode as an operating mode based on the reprogramming software, wherein the reprogramming mode provides to rewrite the control software stored in the memory, and the not-always-on power supply system micro-computer is connected with a power source to be supplied an electric power from the power source according to a user operation, and is disconnected from the power source to stop supplying the electric power according to the user operation; and
    an always-on power supply system micro-computer that operates in the control mode and in the reprogramming mode, wherein the always-on power supply system micro-computer is constantly connected with the power source to be supplied the electric power from the power source without the user operation,
    wherein each of the not-always-on power supply system micro-computer and the always-on power supply system micro-computer includes:
        a first mode determination device that determines whether to operate in an on-board mode when the power source starts to supply the electric power, the on-board mode being an operating mode not carried out under a condition that the electronic control unit is mounted in the object, and being different from the control mode and the reprogramming mode, which are carried out under a condition that the electric control unit is mounted in the object; and
        a second mode determination device that determines whether to operate in the reprogramming mode according to a determination whether the control software is normally written in the memory when the first mode determination device determines not to operate in the on-board mode,
    wherein, when it is determined that the control software is not normally written in the memory, the second mode determination device determines to operate in the reprogramming mode, and instructs another micro-computer to operate in the reprogramming mode,
    wherein the first mode determination device determines not to operate in the on-board mode when the first mode determination device is not instructed to operate in the reprogramming mode,
    wherein the first mode determination device determines to operate in the on-board mode when the first mode determination device is instructed to operate in the reprogramming mode,
    wherein the always-on power supply system micro-computer includes a first transition device that detects a change in a power supply state of the not-always-on power supply system micro-computer when the operation is carried out in the reprogramming mode and the control software is being rewritten,
    wherein the first transition device switches a processing to a determination executed by the first mode determination device when the first transition device detects that the power supply state has changed.

2. The electronic control unit according to claim 1,
    wherein each of the not-always-on power supply system micro-computer and the always-on power supply system micro-computer further includes:
        a third mode determination device that determines whether to operate in the control mode when the second mode determination device determines not to operate in the reprogramming mode, and
    wherein the always-on power supply system micro-computer further includes:
        a second transition device that determines whether the power supply state of the not-always-on power supply system micro-computer has changed from a stop state to a supply state when it is determined to operate in the control mode and an operation is being carried out in the control mode and,
    wherein, when the second transition device determines that the power supply state has changed, the second transition device switches the processing to a determination by the second mode determination device.

3. The electronic control unit according to claim 1,
    wherein the always-on power supply system micro-computer detects whether the power supply state to the not-always-on power supply system micro-computer has changed from a supply state to a stop state when an operation is carried out in the reprogramming mode and the control software is being rewritten and,
    wherein, when the always-on power supply system micro-computer detects that the power supply state has changed, the always-on power supply system microcomputer interrupts rewriting of the control software.

\* \* \* \* \*